(12) United States Patent
Rainer et al.

(10) Patent No.: US 7,804,061 B2
(45) Date of Patent: Sep. 28, 2010

(54) METHOD AND APPARATUS FOR MACHINE-READING MARKINGS ON/IN TRANSPARENT MARKING SUBSTRATES

(75) Inventors: Thomas Rainer, Wernigerode (DE); Reinhard Borek, Halle (DE)

(73) Assignee: Boraident GmbH, Halle / (Saale) (DE)

( * ) Notice: Subject to any disclaimer, the term of this patent is extended or adjusted under 35 U.S.C. 154(b) by 65 days.

(21) Appl. No.: 12/095,826

(22) PCT Filed: Dec. 1, 2006

(86) PCT No.: PCT/EP2006/011551

§ 371 (c)(1),
(2), (4) Date: Jun. 2, 2008

(87) PCT Pub. No.: WO2007/062861

PCT Pub. Date: Jun. 7, 2007

(65) Prior Publication Data

US 2008/0290295 A1 Nov. 27, 2008

(30) Foreign Application Priority Data

Dec. 2, 2005 (DE) .................. 10 2005 057 931

(51) Int. Cl.
*G06K 7/10* (2006.01)
(52) U.S. Cl. ............... 250/271; 250/282; 250/580; 235/491
(58) Field of Classification Search ............... 250/271, 250/580, 282; 235/454, 491
See application file for complete search history.

(56) References Cited

U.S. PATENT DOCUMENTS

| 3,742,833 | A | * | 7/1973 | Sewell et al. | 250/580 |
| 4,665,392 | A | | 5/1987 | Koontz | 340/674 |
| 6,032,860 | A | * | 3/2000 | Brian | 235/454 |
| 6,887,358 | B2 | | 5/2005 | Elger | 204/298.35 |
| 7,607,583 | B2 | * | 10/2009 | Berardi et al. | 235/487 |
| 2003/0106994 | A1 | | 6/2003 | Sage | 250/271 |

* cited by examiner

*Primary Examiner*—David P Porta
*Assistant Examiner*—Jessica L Eley
(74) *Attorney, Agent, or Firm*—Andrew Wilford

(57) ABSTRACT

The invention relates to a method for the machine-reading of markings on/in transparent, especially pane-type, marking carriers, especially glass panes, according to which the marking carrier (2) is illuminated with UV light at least during the period of a machine-reading process of a marking, especially by means of a reading device (4), in order to increase the contrast between a marking (5) and the marking carrier (2). The invention also relates to a device for the machine-reading of markings in transparent, especially pane-type, marking carriers, especially glass panes, comprising at least one reading device (4) for markings arranged on/in a marking carrier, and at least one illumination device (4) is provided for increasing the contrast between a marking (5) and the surrounding transparent marking carrier (2) by illuminating the marking carrier (2) with UV light.

12 Claims, 1 Drawing Sheet

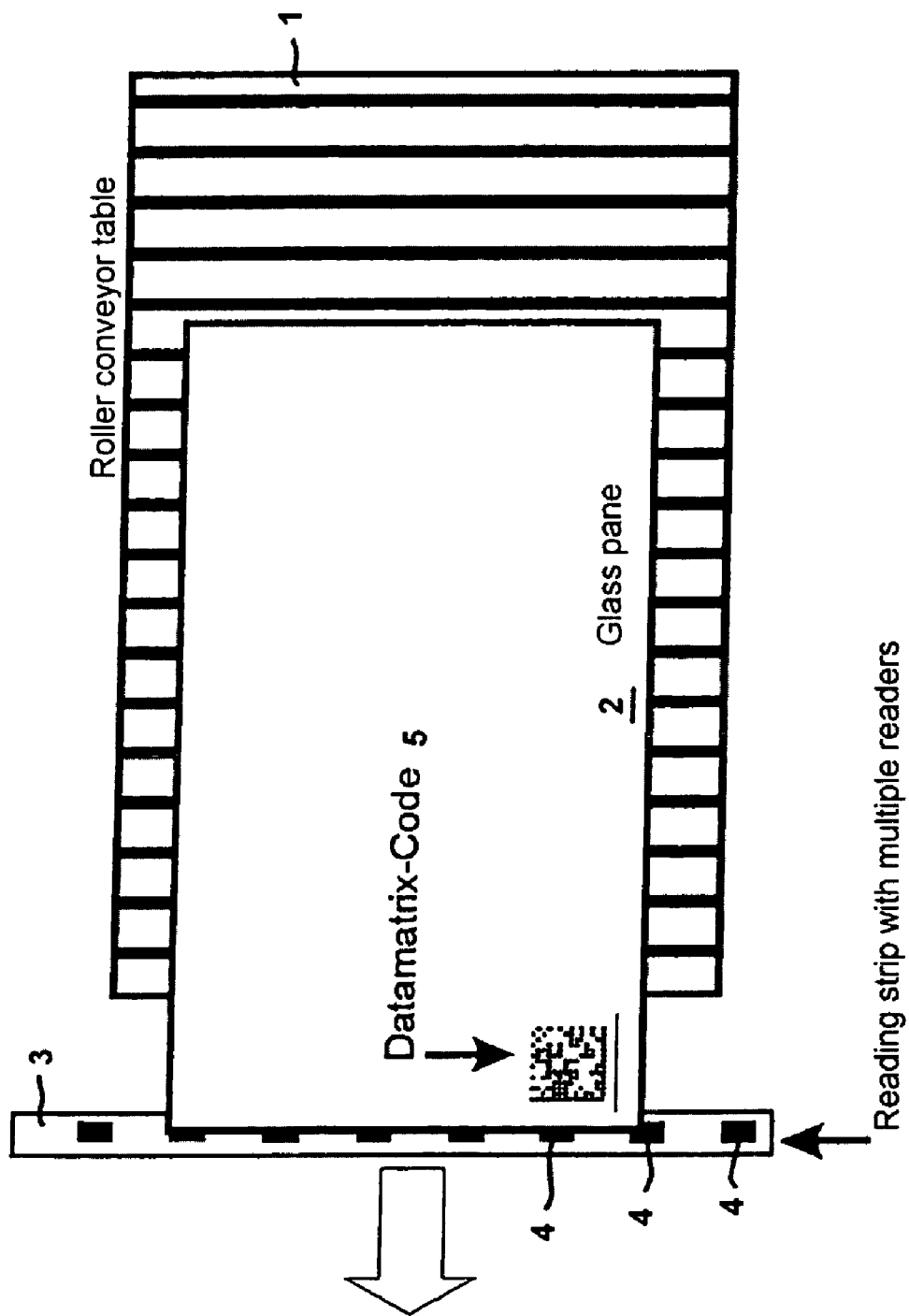

METHOD AND APPARATUS FOR MACHINE-READING MARKINGS ON/IN TRANSPARENT MARKING SUBSTRATES

CROSS REFERENCE TO RELATED APPLICATIONS

This application is the US national phase of PCT application PCT/EP2006/011551, filed 1 Dec. 2006, published 7 Jun. 2007 as WO 2007/062861, and claiming the priority of German patent application 102005057931.0 itself filed 2 Dec. 2005, whose entire disclosures are herewith incorporated by reference.

The invention relates to a method and an apparatus for the machine-reading of markings on/in transparent, especially pane-type marking substrates, especially glass panes.

The prior art discloses that transparent objects, for example pane-type objects and here, especially glass panes, are provided with markings. Such markings can e.g. be used to identify the manufacturer of a pane or they can constitute a test mark, for example for a special glass manufacturing process or treatment procedure, such as during the manufacture of tempered safety glass. A marking on or in transparent objects can furthermore have any other meaning.

Such transparent object, which, apart from the typical glass panes provided can also comprise any other transparent material designs, can therefore be subjected to inspection, if a marking exists.

At the same time, problems occur because markings on or in transparent marking substrates are indistinct and difficult to recognize because of the transparency of the marking substrate, wherein the perceptibility can also depend on the existence of a suitable background. At the same time, the perceptibility of the marking in a transparent marking substrate is even then difficult, if the actual marking has sufficient coloring, i.e. it is maximum black, for example.

The problem of perceptibility of markings on or in transparent marking substrates therefore essentially depends on achieving a suitably sufficient contrast between the marking and a background of the marking.

Because of these difficulties, there are currently no satisfactory methods or apparatuses in order to achieve machine identification and/or machine-reading of a marking in a transparent marking substrate with adequate reliability and consequently check industrial manufacturing processes or treatment processes.

The above-mentioned difficulties occur particularly then, when the marking contains machine-encoded information, whose correct decoding is decisive for the control of a manufacturing or treatment process. This can involve markings of bar codes or data matrix codes, for example.

Machine recognition of markings becomes particularly problematic, when the coloring or absorption of a marking is faint and/or small. This may be desirable, for example, so that a marking is either not or almost not recognizable with the bare eye, in order to prevent that a marking is perceived as a defect in the appearance of the article. However, such marking must be machine-readable to enable inspection of the respective marking substrate. This application of marking of marking substrates with a weak contrast therefore normally represents the most frequent application of markings for transparent marking substrates.

The object of the invention is to provide a method and an apparatus, making it possible to read markings in transparent marking substrates of all types reliably and rapidly, particularly by machine, and at the same time particularly acquire machine encoded information from the marking.

The invention teaches that this object is solved through a method with which at least during the period of a machine-reading process of a marking, the marking substrate is illuminated with UV light, particularly by means of a reading device provided therefore, in order to increase the contrast between a marking and the marking substrate.

This object is furthermore solved using an apparatus which has at least one reading device for marking arranged in/on a marking substrate and which is provided with at least one illumination apparatus in order to increase the contrast between a marking and the surrounding transparent marking substrate by means of UV light exposure of a marking substrate.

The principal idea according to the invention with the proposed method and the apparatus is based upon the fact that the contrast between a marking and the surrounding transparent material of the marking substrate can be increased by UV light exposure. This increase in contrast is essentially based upon that fluorescent light is generated through the UV light exposure of the transparent marking substrate, if the material of the marking substrate can be excited for fluorescence through UV light. This is the case with many transparent materials, particularly with glass.

According to the invention, it can thus be provided that an exposure and/or illumination of the marking substrate with UV light is performed for the period of the machine-reading, or also continuously, if necessary, in order to achieve the increase in contrast according to the invention at least intermittently, enabling reliable reading of a marking during the existence of this contrast increase, especially whereby not only the presence of a marking can be checked, but the information content of a marking can also be acquired.

In a preferred embodiment of the method as taught by the invention it can therefore be provided that the UV light is coupled via a surface into the marking substrate which is essentially arranged perpendicular in relation to the plane in which the marking on/in the marking substrate is located. Especially with pane-type marking substrates, such as glass panes, such surface can involve a front face. In this instance, the front face of a pane-type marking substrate is to be understood as involving a narrow side, which essentially results from the thickness of the pane-type marking substrate and which connects the two large dominating pane surfaces.

Using the previously described type of coupling of UV light via a front face it can then be achieved that the material of the marking substrate is excited for fluorescence, which is especially the case with glass panes, since these particularly in the case of float glass production have a high tin content at least on one side of the pane.

The material of the marking substrate can thus, preferably by means of the coupled UV light, be excited for fluorescence in the surroundings of the marking, so that a marking which does not or at least only insignificantly fluoresce, stands out dark in front of a bright fluorescent background. In such manner, the self-fluorescence of the marking substrate induced by the fluorescence will achieve an increase in contrast for marking.

At the same time, it is particularly advantageous, if the location of coupling the UV light is at a distance from the marking, which in particular is less than the absorption length of the material of the marking substrate at the wavelength of the UV light used. In this instance, absorption length is to be understood as a length in accordance with which the intensity of the beamed UV light has dropped down to 1/e of the original amount.

Making this selection will achieve that the fluorescence generated by the coupling results mainly in the immediate surroundings of the marking. For this reason it is particularly advantageous if a marking is located near the border of a pane-type marking substrate, particularly preferably in a corner of a pane-type marking substrate, if necessary, because then the coupling of the UV light can be done from two different front faces, if necessary.

In an alternative embodiment of the method it can therefore likewise be provided that the UV light is coupled via a surface into the marking substrate which is essentially arranged parallel in relation to the plane in which the marking on/in the marking substrate is located. Such surface can, for example, involve one of the two large dominating pane surfaces of a pane-type marking substrate, i.e., particularly a glass pane.

Coupling the UV light into such pane surface can achieve that the material of the marking substrate is excited for fluorescence through the UV light, wherein it is particularly preferably provided that this is performed at a distance to the marking, so that the surroundings of the marking itself does not fluoresce and the marking is only illuminated through the fluorescent light which propagates in the marking substrate, particularly through total reflection.

In this instance, any type of marking can represent an imperfection in/on the marking substrate on which the fluorescent light during its propagation between the pane surface is uncoupled from the marking substrate, so that the marking appears bright on dark background Such imperfection can, for instance, result from imprinting, mechanical destruction (engraving, micro cracks), particulate embedment or also through change of the refractive index.

This too, will therefore produce the desired increase in contrast, so that the machine-reading of such marking, in which the contrast may be weak when not illuminated, is possible.

At the same time, it can preferably be provided that the location of the UV light is at a distance from the marking, which in particular is greater than the absorption length of the material of the marking substrate at the wavelength of the UV light used. In this way, no UV light will reach the surroundings of the marking, since it was previously sufficiently absorbed, and the illumination of the marking can thus only be done through the fluorescent light, which can essentially propagate unimpeded in the pane-type marking substrate, particularly through total reflection.

Pursuant to the second alternative, this type of increasing the contrast can be done in an equivalent manner with any other light, instead of UV light, also such light which does not produce fluorescence. In this way, the coupled light is utilized without the intermediate step of generating fluorescent light in order to illuminate a marking. The light can essentially be coupled on any location of any surface of a marking substrate, since it propagates in the marking substrate through total reflection, particularly at small absorption and will thus always reach the marking, particularly when this is arranged in the volume of the marking substrate.

At the same time, it is considered particularly advantageous for both above-mentioned alternatives, if at least the surroundings of a marking is shielded from environmental light during the reading process, whereby especially the shielding itself can occur through a reading device or also through an illumination apparatus, if necessary. This will prevent that environmental light interferes by reducing the contrast during the reading of the marking.

Particularly when using the method as taught by the invention in connection with the reading of markings in glass panes, a UV light wavelength in the range of 240-280 nm can be selected. This is particularly advantageous for the reason that glass and especially float glass has a particularly high absorption and fluorescence effect because of the tin ions present.

The method as taught by the invention is usable with any type of marking. Such marking can for instance be located on a surface of a marking substrate, for example through imprinting or engraving. It is likewise possible that a marking is located in the volume of a marking substrate, whereby such marking can, for instance, be developed through e.g. laser generated micro-cracks and/or metal particles/metal ions and here in particular silver particles/silver ions.

A method for performing such marking of metal particles in the volume of a marking substrate can be provided for instance during the application with glass, in that a donor medium containing metal ions is applied on the glass surface and is then illuminated with a laser beam. Due to the laser induced heat input into the glass, this may cause a diffusion of metal ions in the glass and because of the presence of additional ions in the glass, e.g. the tin ions, result in a reduction and particle formation. By writing on a predetermined trajectory by means of the laser beam, a marking which conforms to the trajectory can be written into the glass, also with pulsed laser operation, if necessary.

Especially when using a donor medium, for example a film which contains silver ions, in this way silver particle containing and/or silver ion containing markings can be generated in glass.

Particularly for this reason, the above-described type of marking by the introduction of silver ions into the volume of glass, especially from the tin bath side of the glass, markings are generated that have very low contrast and produce only a local change in the refractory index, for instance, so that the method as taught by the invention is particularly suited for this type of marking.

The method as taught by the invention is moreover particularly suited for such type of pane-type marking substrates, where e.g. on one side of the pane an imprint, lettering, silvering or any other background is provided, so that there is no possibility to obtain a different increase of contrast of the marking against a background, for example by shading of the pane-type marking substrate. By means of the method as taught by the invention, it is also possible to couple the necessary UV light into such treated marking substrates, in order to thereby achieve an increase in contrast.

In a particular application of the method as taught by the invention, especially in connection with the above-mentioned apparatus as taught by the invention, it can thus be provided to read markings in glass panes, which are located underneath the tin-containing glass surface, i.e. the bath side, and are comprised of the above-mentioned silver-containing markings and/or at least include these. In addition to the markings in glass that result through embedment and particle formation of metal ions, and here specifically silver ions, here deposits can also be used to increase contrast within the scope of the method as taught by the invention, which remain on the glass surface during the marking process, for example, if a film serving as ion donor medium, for example, is trans-illuminated by means of a laser beam and whereby the film is at least partially scorched. This results in scorching residues, which trace the marking on the glass surface and therefore contribute to increasing the contrast within the scope of the method as taught by the invention.

This type of producing a marking also results in a direct deposit on the surface, e.g. through pure silver, due to reduction in the ambient atmosphere.

As mentioned at the outset, an apparatus as taught by the invention can be used for reading and/or detecting and/or recognizing a marking, such as in a data matrix code 16 or any other marking on a glass pane, which in addition to a reading device has also an illumination apparatus in order to achieve the increase in contrast previously described.

In an especially preferred embodiment of the apparatus as taught by the invention, it can at the same time be provided that this apparatus includes at least one roller conveyor table or one roller transfer path, serving for conveying pane-type marking substrates and here especially glass panes, whereby the reading and illumination apparatus is arranged on the roller conveyor table/roller transfer path. In this instance, for example a reading and illumination apparatus can be designed as a structural element.

Therefore, the possibility exists for machine-reading of markings arranged in/on transparent marking substrates, and here specifically glass panes, if these are conveyed by means of rollers. Thus, for this purpose, for example, at least one illumination and reading device can be arranged between two rollers and/or at the end of such roller conveyor table and/or one such roller transfer path. Likewise, it is possible to provide several illumination and reading devices for simultaneous reading of markings on several marking substrates, since several marking substrates are usually conveyed on such path next to each other and in tandem, such as glass panes.

In this way, in a particularly preferred embodiment of the apparatus and arrangement from several reading/illumination apparatuses lying next to each other linear or in tandem can be provided, which e.g. can be mounted between two rollers or at the end of the table conveyor, whereby the arrangement can be developed as a strip.

An illustrated embodiment of the apparatus as taught by the invention for use with the method as taught by the invention is illustrated in the following FIGURE.

FIG. 1 shows a plan view of a roller table 1, in which the width of the table can vary according to the application. The design of the present illustrated embodiment is such that a float glass pane 2 is conveyed across table 1. Such pane 2 can e.g. be partitioned only later, for which the pane can e.g. already have the necessary score marks as predetermined breaking points. In this instance, this can also involve several rows of float glass panes 2 arranged side-by-side, whose front faces are adjacent to each other.

Here it is provided that a reading strip 3 is arranged at the end of the left side of the roller table 1, which comprises several individual structural elements from illumination and reading device 4. These reading and illumination apparatuses 4 are arranged at a distance here, in order to read markings in or on the glass panes 2 to be conveyed. Here, one such marking is illustrated as data matrix code 5 in the left bottom corner, as an example.

The reading strip 3 is arranged such that the markings 5 which on the lower side in relation to the illustration of the glass panes 2 provided here, can be read from below, whereby at least during the period of reading, an illumination of the glass panes with light, preferably UV light, is done, so that at an increase in contrast of the marking can be achieved at least intermittently during the reading process, and here especially of a marking with silver particles in the glass.

In this way, with the help of the method as taught by the invention and the apparatus as taught by the invention, an inspection of the markings 5 during a glass manufacturing or treatment process can take place with respect to different and/or any criteria. In this way, it can be determined, for example, whether a marking 5 exists or not, and/or a code represented by the marking 5, can be read-out.

The illustrated embodiment is not limited to the arrangement described above, but on the other hand also wider arrangements of the table, and/or smaller widths of the glass panes can be used, so that several rows of glass can be processed next to each other in production. According to the number of rows of glass panes and/or number of the markings arranged next to each other across the width of a table on or in the glass, the number of apparatuses for reading and/or illumination can be selected on the table, particularly in the reading strip provided for this purpose. Also several apparatuses for reading and/or redundancy can be provided, in order to acquire a marking on a pane, where the position is not predetermined. In this way, it can be ensured that a marking can be acquired at least by one of the apparatuses.

The individual reading/illumination apparatuses can be interlinked in one application and/or it can be provided supplementary or alternatively, that the information which is acquired from the marking by such apparatus can be automatically forwarded to a data processing system, e.g. for controlling a production or treatment process.

It must be pointed out that the apparatus as taught by the invention as well as the method as taught by the invention is not limited to the application with glass panes, even if this is the application which has been primarily described here. Any type of marking substrate can be examined for the existence of markings by means of the method and/or the apparatus as taught by the invention.

The invention claimed is:

1. A method for machine-reading of markings on/in transparent marking carriers or glass panes wherein the markings are created from laser-produced micro cracks or metal particles/metal ions in the volume of the marking carrier and at least during the period of a machine-reading and recognition process by a reading device, the contrast between the marking and the marking carrier is increased by illumination of the marking carrier with UV light that is coupled into the marking carrier via a surface extending essentially perpendicular to a plane in which the marking in or on the marking carrier is located, and thereby exciting into fluorescence the material of the marking carrier surrounding the marking so that the marking does not or only slightly fluoresces and stands out dark against a bright fluorescing background.

2. The method according to claim 1 wherein the surface is formed by a front face of a pane-type marking carrier, particularly a glass pane.

3. The method according to claim 1 wherein the location of coupling the UV light has a distance from the marking which is smaller than the absorption length of the material of the marking carrier at the wavelength of the UV light used.

4. The method according to claim 1 wherein UV light is coupled into the marking carrier via a surface, which is arranged essentially parallel in relation to the plane in which the marking on/in the marking carrier is located.

5. The method according to claim 4 wherein the surface is formed through the pane surface of a pane-type marking carrier, particularly a glass pane.

6. The method according to claim 4 wherein the location of coupling the UV light has a distance from the marking which is greater than the absorption length of the material of the marking carrier at the wavelength of the UV light used.

7. The method according to claim 1 wherein at least the surroundings of a marking is shielded from environmental light during a reading process, particularly whereby the shielding is done by the reading device itself.

8. The method according to claim 1 wherein the UV light has a wavelength in the range of 240 to 280 nm.

9. The method according to claim 1 wherein a marking is arranged on a surface of a marking carrier in the form of print, deposit or engraving.

10. The method according to claim 1 wherein a marking is arranged in the volume of a marking carrier, particularly whereby the marking is formed by micro cracks or metal particles, particularly silver particles or metal ions, particularly silver ions.

11. A method for machine-reading markings on/in transparent marking carriers or glass panes wherein the markings are created from laser-produced micro cracks or metal particles/metal ions in the volume of the marking carrier and at least during a machine-reading and recognition process by a reading device, the contrast between the marking and the marking carrier is increased by illumination of the marking carrier with UV light that is coupled into the marking carrier via a surface extending essentially parallel to a plane in which the marking on/in the marking carrier is located, the material of the marking carrier spaced from the marking being excited to fluoresce through the UV light so that the surroundings of the marking do not fluoresce and the marking is illuminated in the marking carrier particularly through total reflection of propagating fluorescent light.

12. A method for machine-reading markings on/in transparent marking carriers or glass panes wherein the markings are created from laser-produced micro cracks or metal particles/metal ions in the volume of the marking carrier and at least during a machine-reading and recognition process by a reading device, the contrast between the marking and the marking carrier is increased by illumination of the marking carrier with UV light that is coupled into the marking carrier via a surface extending essentially parallel to a plane in which the marking on/in the marking carrier is located, the marking being an imperfection in the marking carrier, on which the fluorescent light un-couples from the marking carrier, so that the marking appears bright on a dark background.

* * * * *